(12) United States Patent
Lowell et al.

(10) Patent No.: US 6,237,846 B1
(45) Date of Patent: May 29, 2001

(54) BODY WEARABLE KEYBOARD

(75) Inventors: Richard Wayne Lowell, Ramona; Kazuhiko Inagaki, San Diego, both of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/106,792

(22) Filed: Jun. 29, 1998

(51) Int. Cl.[7] .................................................. G06C 25/00
(52) U.S. Cl. ........................................... 235/145 R; 235/1
(58) Field of Search ..................... 235/375, 145, 235/1

(56) References Cited

U.S. PATENT DOCUMENTS

| | | | |
|---|---|---|---|
| 4,613,247 | 9/1986 | McGunnigle | 400/486 |
| 5,115,390 | 5/1992 | Fukuda et al. | 364/146 |

*Primary Examiner*—Harold I. Pitts
(74) *Attorney, Agent, or Firm*—Reneé Michelle Larson (57) ABSTRACT

A body-wearable keyboard features an optimized key layout that can be used in a conventional configuration or a body-wear configuration. By rotating one or more key clusters, the keyboard can be used in a vertical lengthwise position resting flat on the body on the user in the body-wear configuration. Multiple placement of frequently used keys in the key clusters provides for ease of use, whether the keyboard is in the conventional configuration or the body-wear configuration.

40 Claims, 7 Drawing Sheets

BODY WEARABLE KEYBOARD

FIELD OF THE INVENTION

The present invention relates generally to keyboards, such as computer keyboards, and more particularly to a "wearable" keyboard that provides hands-free portability for mobile users while allowing easy data entry when standing, sitting, or reclining.

BACKGROUND OF THE INVENTION

Keyboards are commonly found as integral parts of computer installations as the most common mechanical user interface with the computer for data entry. Most keyboards are connected to the computer by a length of electrical cable, and are designed to be used in a fixed horizontal manner as with a conventional typewriter. One disadvantage of this approach is that the user is severely restricted in terms of physical location and movement, and is typically required to be a foot or two in front of the computer monitor screen. Another disadvantage of the standard keyboard is that it consumes otherwise usable space, such as area on a desktop. Further disadvantages are that the fixed type of keyboard cannot as easily be used in the standing position if it had been previously adjusted for use while sitting, and the keyboard is impractical were the user to assume a reclining position because the keyboard requires a stable horizontal platform for mechanical stability.

Another type of keyboard in common usage is the wireless keyboard that has a wireless data link rather than an electrical cable. The wireless keyboard contains an infrared or radio frequency transmitter, and typically a small receiving unit is located in the vicinity of the computer and connected to it by electrical cable. The wireless keyboard allows greater user freedom of movement, but the physical design of the wireless keyboard has remained that of the conventional computer keyboard previously discussed, requiring that it be deployed in a horizontal position only, such as across the user's lap, on a desk, or on another horizontal surface. One disadvantage of the wireless keyboard is that although portable it requires the user to physically grasp it in order to move about, meaning that it does not provide hands-free portability. Another disadvantage of the wireless keyboard is that it consumes otherwise usable space, such as the lap of the user or desktop area. A further disadvantage is that the wireless keyboard cannot easily be used by the user in the standing position if it was previously positioned for use while sitting. Moreover, the keyboard is impractical if the user were to assume a reclining position as the wireless keyboard requires a stable physical platform to rest on.

Yet another type of keyboard is designed to be held by the user in one hand and operated with the other hand, as is common in wireless remote control devices for television and audio systems. Typically these keyboards are small enough to be held in one hand while being operated by thumb or fingers of the same hand or the other hand. However, this approach is not practical for a standard keyboard having the large number of standard keys. Another disadvantage of this type of keyboard is that although it is portable it cannot be moved in a hands-free manner. An additional disadvantage is that one hand of the user is required to hold it during operation; if it is not hand-held it consumes lap or desktop space and is not portable during operation.

The touch-sensitive keyboard is another type of keyboard that is located permanently across the front screen of a computer monitor. The user must therefore remain directly in front of the computer monitor to use the keyboard and so there is no freedom of movement for the user. This type of keyboard is not portable unless the whole monitor is moved. Another type of keyboard is also built into the computer monitor but is capable of handwriting recognition. A keyboard capable of handwriting recognition may require less keys to be provided, but otherwise suffers from all the disadvantages of the touch-sensitive type of keyboard and additionally requires extensive software for the handwriting recognition.

It is clear that these types of keyboards in current use have various shortcomings, such as restricting the physical location and/or movement of the user in some manner. There is therefore an unmet need in the art for a keyboard that does not restrict the physical location and movement of the user, that does not consume or require desk or lap space, that is easily used in the standing, sitting, or reclining positions, that is portable in a hands-free manner, that does not require a physical connection, that can be configured easily for either portable or conventional orientations, and which would offer an arrangement of keys that would increase user efficiency.

SUMMARY OF THE INVENTION

It is accordingly an object of the invention that a keyboard not restrict the physical location and movement of the user of the keyboard.

It is further an object of the invention that the keyboard not consume or require desk or user lap space.

It is another object of the invention that the keyboard be easily and readily used while the user is in the standing, sitting, and reclining positions.

It is further another object of the invention that the keyboard be portable in a hands-free manner.

It is yet another object of the invention that the keyboard not require a physical connection to the computer or other device or system to which it is communicating.

It is another object of the invention that the keyboard be capable of being easily configured for either portable or conventional orientations of its keys.

It is further an object of the invention that the keyboard offer an arrangement of its keys that would increase user efficiency.

It is finally an object of the invention that such a keyboard provide the foregoing objects while retaining a conventional keyboard key layout so that minimal learning of the placement of the keys is required by the user.

Therefore, according to the present invention, a body-wearable keyboard features an optimized key layout that can be used in a conventional configuration or a body-wear configuration. By rotating one or more key clusters, the keyboard can be used in a vertical lengthwise position resting flat on the body on the user in the body-wear configuration. The keyboard has three key clusters. A first key cluster on the right end of the keyboard is manipulated by the right hand of the user and is not capable of being rotated. A second key cluster in the middle of the keyboard is a calculator key cluster that is capable of being rotated. A third key cluster on the left end of the keyboard is also capable of being rotated. Rotation is accomplished by removing, rotating, and then replacing the key cluster back into the keyboard.

In the conventional configuration of the keyboard, neither the second or third key clusters are rotated and the keyboard differs from a conventional keyboard in that the second, calculator key cluster is located in the middle of the keyboard. The user's right hand manipulates the first and second key clusters, while the user's left hand manipulates the third key cluster in the conventional manner. In the body-wear configuration of the keyboard, the third key cluster of the keyboard is rotated so as to be easily accessible to the left hand of the user when the keyboard rests on the user's body in a vertical lengthwise fashion. Additionally, the second key cluster may also be rotated to be accessible to the left hand of the user when the keyboard is in the vertical, lengthwise position on the user's body in the body-wear configuration.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing(s), wherein:

DESCRIPTION OF THE INVENTION

The body wearable keyboard is easily convertible between a conventional use configuration and a body-wearable configuration, and features a novel key layout which increases efficiency when used in either configuration. The body wearable keyboard is useful in one-handed or two-handed mobile data entry and remote control applications, regardless of whether the keyboard user is standing, sitting, or reclining. The familiar keys of known computer and typewriter keyboards are retained, and physical key orientation is adjustable to accommodate various user positions. The present invention also describes the inclusion of a computer monitor screen and optional modules with the body wearable keyboard so as to provide hands-free portability for a complete computer system.

Referring to FIGS. 1A–1D, a Body-wearable Keyboard 100 configured for body wear orientation, according to a first embodiment of the present invention, is shown. It will be noted that keyboard 100 has been duplicated several times in FIGS. 1A–1D in order to allow various key groupings and features of the keyboard 100 to be clearly referenced and demonstrated.

YUIOP Character Key Cluster 110 is designed for use by the right hand in the conventional manner. It is built into the keyboard and is not meant to be removable. YUIOP Character Key Cluster 110 is comprised of the following keys: F8, F9, F10, F11, F12, F13, F14, F15, F16, Escape Key 178, 7/&, 8/*, 9/(, 0/), -/_, =/+, Backspace, Home, Y, U, I, 0, P, [/{, ]/}, \|, Pg Up, H, J, K, L, ;/:, '/", Right Hand Return Key 140, Pg Dn, N, M,/<, />, //?, Shift, Up Arrow, End, Right Hand Space Bar 135, Alt, Option 1, Option 2, Left Arrow, Down Arrow, Right Arrow, and Right Hand Gimbal Control 196.

Figure 3:
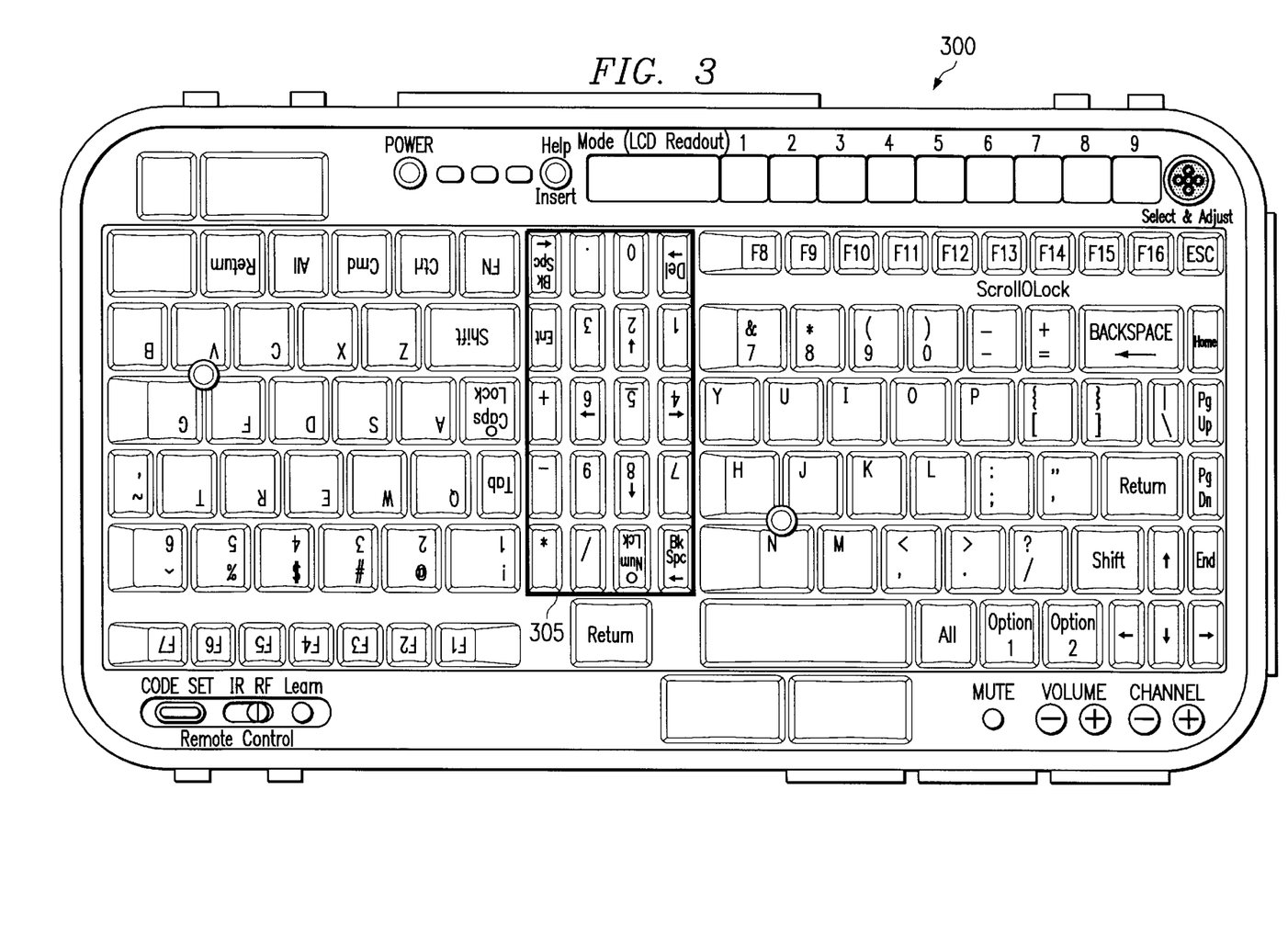
FIG. 3 is a Drawing of a Keyboard for Body Wear Orientation, according to a third embodiment of the present invention.

Calculator Key Cluster 115 is designed for use by either the right hand or the left hand, and is shown configured for use by the right hand. Calculator Key Cluster 115 is physically removable from the keyboard. After removal Calculator Key Cluster 115 can be rotated 180 degrees and reinserted into the keyboard, whereupon all key functions are as before but cluster orientation is for left hand operation. This aspect is illustrated in FIG. 3, in which a body-wear orientation keyboard 300 with rotated Calculator Key Cluster 305 is shown. Calculator Key Cluster 115 is comprised of the following keys: First Calculator Backspace Key 155, Num Lock, /, *, 7, 8/Up Arrow, 9, −, 4/Left Arrow, 5, 6/Right Arrow, +, 1, 2/Down Arrow, 3, Enter, Delete, 0,., and Second Calculator Backspace Key 160.

QWERT Character Key Cluster 105 is designed for use by the left hand, and is shown configured for body wear orientation. QWERT Character Key Cluster 105 is physically removable from the keyboard. After removal QWERT Character Key Cluster 105 can be rotated 180 degrees and reinserted into the keyboard, whereupon all key functions are as before but cluster orientation is for left hand body-wearable operation, as shown. QWERT Character Key Cluster 106 is comprised of the following keys: F1, F2, F3, F4, F5, F6, F7, 1/!, 2/@, 3/#, 4/$, 5/‰, 6/^, Tab, Q, W, E, R, T, '/~Key 170, Caps Lock, A, S, D, F, G, Shift, Z, X, C, V, B, FN, Ctrl, Cmd, Alt, Left Hand Return Key 145, Left Hand Space Bar 130, First Left Hand Mouse Button (Secondary) 144, Second Left Hand Mouse Button (Primary) 146, and Left Hand Gimbal Control 107.

Right Hand Gimbal Control 196, located between character keys "HNJ", allows for cursor control similar to that of a joystick with the right hand in a manner utilized by notebook computers. Right Hand Gimbal Control 196 is normally utilized in conjunction with First Right Hand Mouse Button 142 and Second Right Hand Mouse Button 143. Left Hand Gimbal Control 107 allows a similar function for the user's left hand, and is utilized in conjunction with First Left Hand Mouse Button (Secondary) 144 and Second Left Hand Mouse Button (Primary) 146. Left Hand Gimbal Control 107 may also be utilized in two-handed or two-user operation.

Keyboard Lock Slide Switch 121 prevents accidental keyboard activation. Help/insert Button 165 allows convenient access to Help menus and functions, or is the Insert command. External Power Connector 126 allows external power to be supplied to the keyboard and provides for any internal battery to be charged. Optional Power On/Off Buttons 117 control equipment external to the keyboard, either by hardwired connection or wireless communications channel. Hardwired Connector 127 allows for the use of a cable interface to the keyboard. Additional Modules Slots 128 allow optional modules to be inserted or attached to the keyboard, such as a computer module, flash memory module, communications module, supplemental battery power module and/or other added feature modules. Such modules can easily be upgraded because they are removable. Headphone/Microphone Jack 129 allows for the connection of a headphone and/or microphone to the keyboard for audio signals. First LCD Monitor Attachment Location 120 and Second LCD Monitor Attachment Location 125 are representative attachment means for the optional LCD screen. First LCD Monitor Attachment Location 120 would be utilized when the keyboard is in the body wear configuration, and Second LCD Monitor Attachment Location 125 would be utilized when the keyboard is in the conventional use orientation. The LCD monitor, of FIG. 4, may have its own internal battery or power source or power could be derived from the keyboard itself.

Current Mode LCD 195 indicates the mode setting of the keyboard system, and its viewing angle can be electrically adjusted to compensate for multiple operating positions. Multi-function Button 190 has tilt left/right/up/down for adjustments, and push straight down to select. Multi-function Button 190 is utilized to scroll and select items displayed on Current Mode LCD 195. F8 Assigned Function LCD 131 indicates the current function assigned to F8 for the mode displayed by Current Mode LCD 195. F9 Assigned Function LCD 132 indicates the current function assigned to F9 for the mode displayed by Current Mode LCD 195. F10 Assigned Function LCD 133 indicates the current function assigned to F10 for the mode displayed by Current Mode LCD 195. F11 Assigned Function LCD 134 indicates the current function assigned to F11 for the mode displayed by Current Mode LCD 195. F12 Assigned Function LCD 136 indicates the current function of assigned to F12 for the mode displayed by Current Mode LCD 195. F13 Assigned Function LCD 137 indicates the current function assigned to F13 for the mode displayed by Current Mode LCD 195. F14 Assigned Function LCD 138 indicates the current function of assigned to F14 for the mode displayed by Current Mode LCD 195. F15 Assigned Function LCD 139 indicates the current function assigned to F15 for the mode displayed by Current Mode LCD 195. F16 Assigned Function LCD 141 indicates the current function assigned to F16 for the mode displayed by Current Mode LCD 195. In the default mode, function keys F8 to F16 are defined for standard keyboard use; otherwise, function keys F8 to F16 are customizable to have any function desired by the user.

First Right Hand Mouse Button 142 is the left select button for the mouse function controlled by the right hand. Second Right Hand Mouse Button 143 is the right select button for the mouse function controlled by the right hand. Right Hand Gimbal Control 196 is operated by the right hand. In a similar manner, First Left Hand Mouse Button (Secondary) 144, Second Left Hand Mouse Button (Primary) 146, and Left Hand Gimbal Control 107 are operated by the left hand for both conventional and body wear configurations.

Remote Control IR/RF Select Button 148 allows for selection of the type of wireless control, either infrared or radio frequency. Remote Control Code Set Button 147 allows the keyboard wireless code selected to be entered, and Remote Control Learn Button 149 allows a learn function mode to be activated. Audio presented to the keyboard operator may derive from either local or remote sources, and Audio Mute Button 151, Volume Up/Down Buttons 152, and Channel Up/Down Buttons 153 allow control of the audio mute, volume, and channel functions respectively. Audio Mute Button 151, Volume Up/Down Buttons 152 and Channel Up/Down Buttons 153 may alternatively be utilized to control a remotely located audio system by either hardwired or wireless methods. An internal speaker function may be incorporated into the keyboard.

Internal batteries power the keyboard. These batteries may be supplemented by additional battery capability by insertion of a power module at Additional Modules Slots 128. Power On/Off Switch 112 is incorporated into the keyboard, and electrical circuitry for automatic power turn-on and turn-off may also be included. The keyboard may optionally be powered from an external source.

To protect the keyboard and to keep it clean, the present invention envisions an attached retractable lid or a folding case.

The body wearable keyboard is designed to enable hands-free portability. In this type of application, a neck strap on the left side of the keyboard is used to support the keyboard around the user's neck. Adjustable shoulder/arm straps are optional, as is an adjustable waist strap. The length of the strap may be altered by pressing the adjust button 198 and pulling the needed length from within the side of the keyboard. This allows the user to easily fit the extended strap over his head. Strap length is then adjustable to obtain best keyboard placement and then locked into place by releasing adjust button 198. By releasing adjust button 198 for keyboard removal, the user would press adjust button 198, remove the strap from around the neck, and then retract the excess strap length back into the side of the keyboard for storage. To help distribute keyboard weight over the back of the neck to provide the necessary measure of comfort the strap may be cushioned. Additionally, the far end of the strap may be detached from the keyboard by the release button 199.

When configured as above, the keyboard is portable without the use of hands. The keyboard may also be operated while being carried, with proper left/right hand selection being provided as shown by the configuration of FIGS. 1A–1D. Note that Calculator Key Cluster 115 may be optionally rotated 180 degrees in a manner similar to that of QWERT Character Key Cluster 105. Portable operation is therefore provided whether the user is standing, sitting, or reclining. These degrees of freedom for the user guarantee that the keyboard is always available and ready for use.

The present invention utilizes a redesigned full character computer keyboard. It features an optimized key layout that can be used in a standard human/keyboard orientation or, by rotating one or more key cluster sections by 180 degrees, will allow the user to use the keyboard in a vertical lengthwise position resting flat to the chest and stomach. In this case, QWERT Character Key Cluster 105 (and optionally Calculator Key Cluster 115) are rotated 180 degrees from "normal" while the right side YUIOP Character Key Cluster 110 is not rotated. In use the left hand touches OWERT Character Key Cluster 105 (and optionally Calculator Key Cluster 115) and the right hand touches YUIOP Character Key Cluster 110 (and optionally Calculator Key Cluster 115). The general use of the keyboard is enhanced by the multiple and strategic placement of Right Hand Space Bar 135, Left Hand Space Bar 130, Right Hand Return Key 150, Left Hand Return Key 145, First Calculator Backspace Key 155, and Second Calculator Backspace Key 160. General keyboard use is also enhanced by the relocation of Escape Key 178, and Left Hand '/~ Key 170. Because of minimal key relocations and the multiple placement of frequently used keys, the time needed to learn to use the body wearable keyboard is minimal while use is optimized for either conventional or body wear use. A feature of the present invention is the novel use of two backspace keys whose locations do not change when the Calculator Key Cluster 110 is rotated.

Calculator Key Cluster 115 has been relocated to the center of the keyboard between QWERT Character Key Cluster 105 and YUIOP Character Key Cluster 110 so that it may be operated by either the right or the left hand of the user, depending upon the rotation or non-rotation of Calculator Key Cluster 115. In order to minimize the width of Calculator Key Cluster 115, narrower keys are utilized (Narrow Key (typical) 180). This allows QWERT Character Key Cluster 105 and YUIOP Character Key Cluster 110 to be placed more closely together.

The keyboard may be electrically linked to other devices and systems by wireless or cable means, wherein such links may be analog or digital in nature and may be one-way or two-way in operation, as may be required by operational requirements. Applications include, but are not limited to, electrical linkage of the keyboard with computing, analog audio, analog video, data communications, and remote control equipments and systems.

The linkages possible between the keyboard of the present invention and various applications will now be further discussed. Linkage with computing equipments and systems will allow for data transfer, operation or control of general electronic equipment, conditional access, password protection, and encryption/decryption. Linkage with analog audio equipment and systems will allow for telephone audio links, links with other audio systems, and voice command for system control, while linkage with analog video equipment and systems will allow for video conferencing, security camera monitoring, an external connection for video-related equipments. For both analog audio and video equipment, multiple channels and scrambling/descrambling capabilities may be used. Linkage with data communications equipment and systems will allow for audio, video, telephone, video conferencing, security camera monitoring, and access to intra/inter networks. The optional use of password protection and encryption/decryption is also envisioned. Finally, linkage of the keyboard with remote control equipment and systems, including backwards compatibility with existing remote control formats, allows for the remote control of various electronic equipments and the optional inclusion of conditional access, password protection and encryption/decryption.

Figure 2:
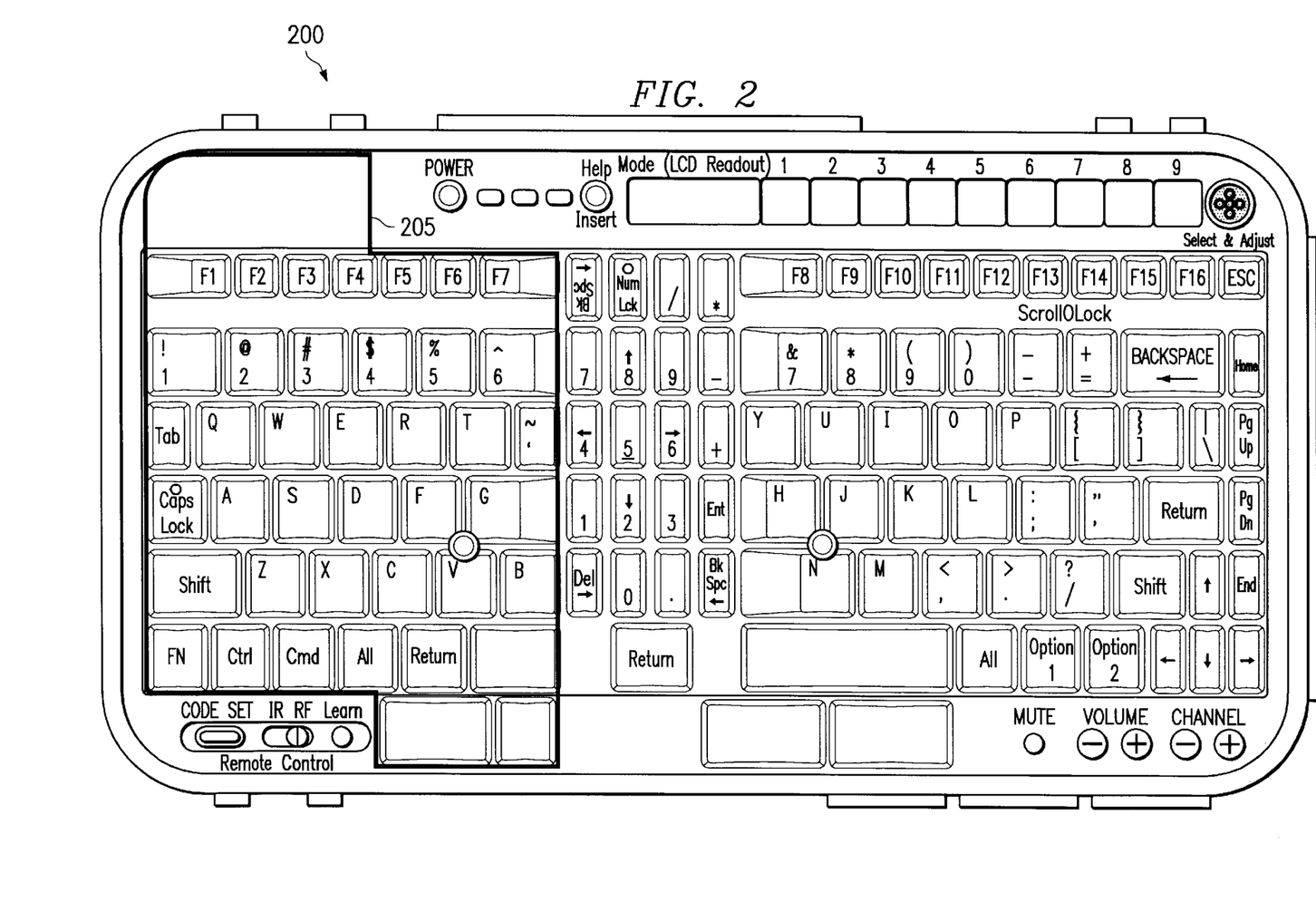
FIG. 2 is a Drawing of a Keyboard for Conventional Use Orientation, according to a second embodiment of the present invention.

While the keyboard of the present invention has been demonstrated with one or more key clusters of the keyboard rotated, it may additionally be used in the manner of a conventional keyboard. Referring now to FIG. 2, a conventional orientation keyboard 200 is shown. QWERT Character Key Cluster 205 is identical to QWERT Character Key Cluster 105 (after it has been rotated 180 degrees), and is shown here for clarity.

Figure 1A:
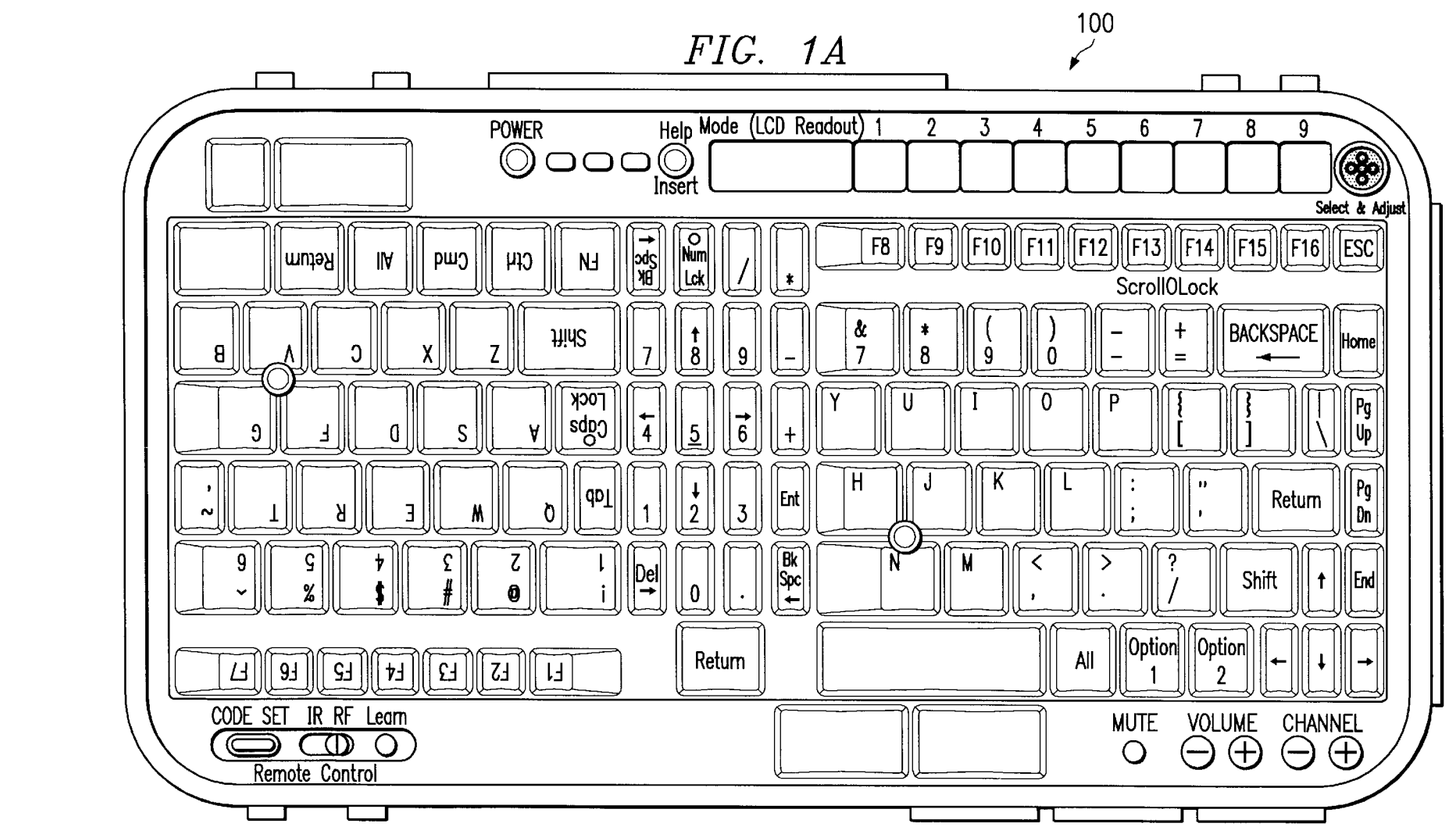
FIGS. 1A–1D are Drawings of a Keyboard for Body Wear Orientation, according to a first embodiment of the present invention.
Figure 1B:
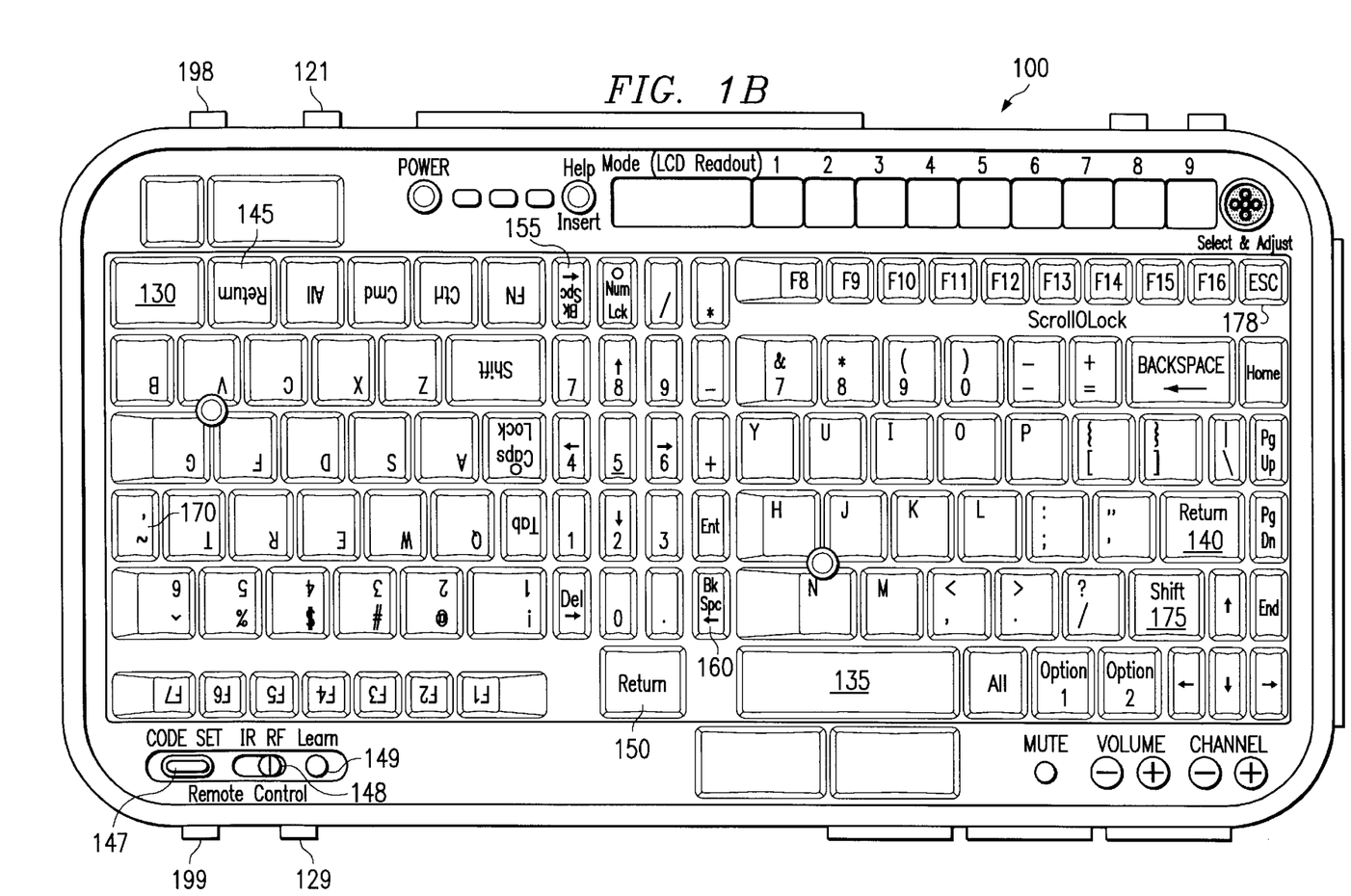
Figure 1C:
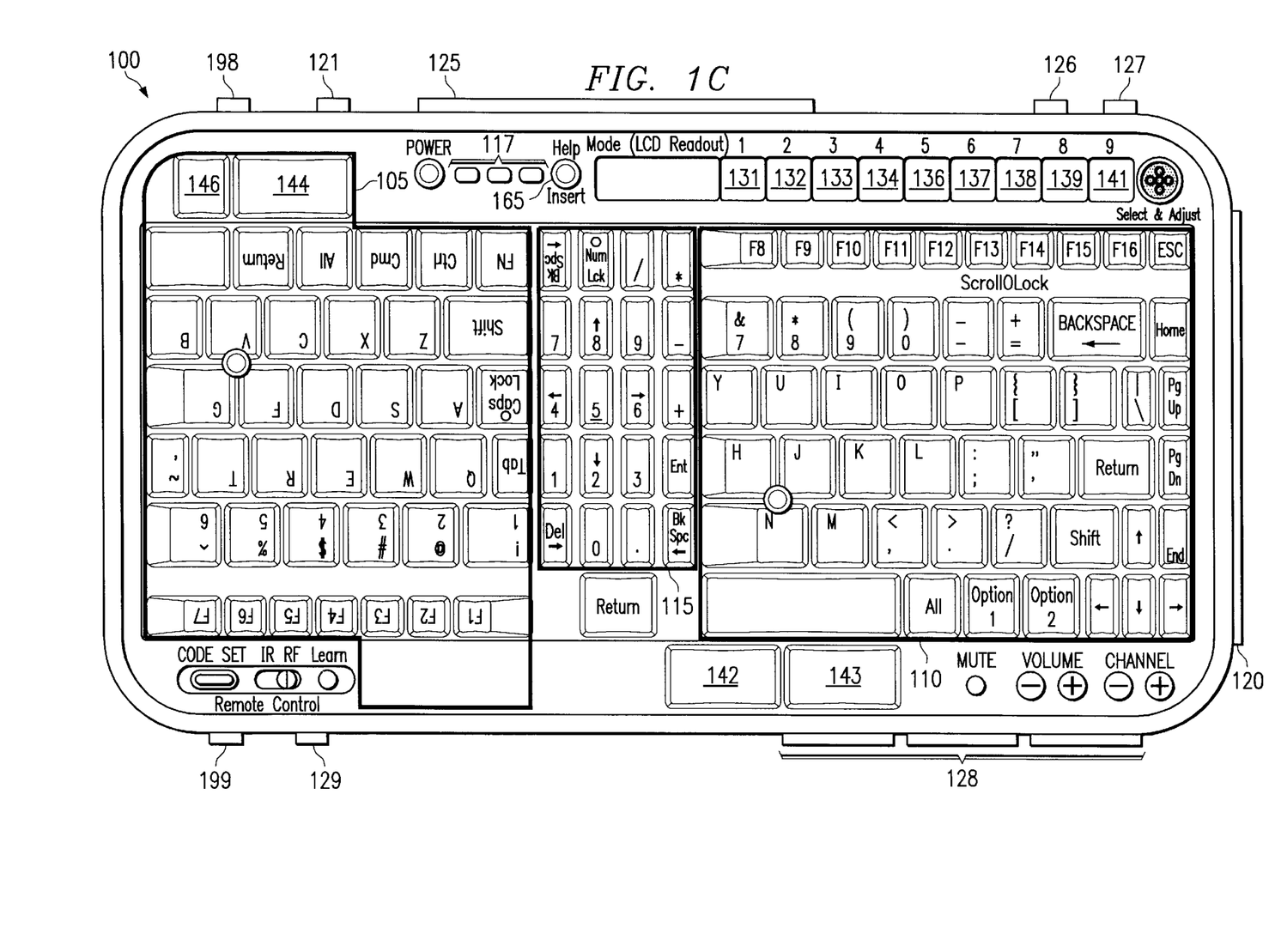
Figure 1D:
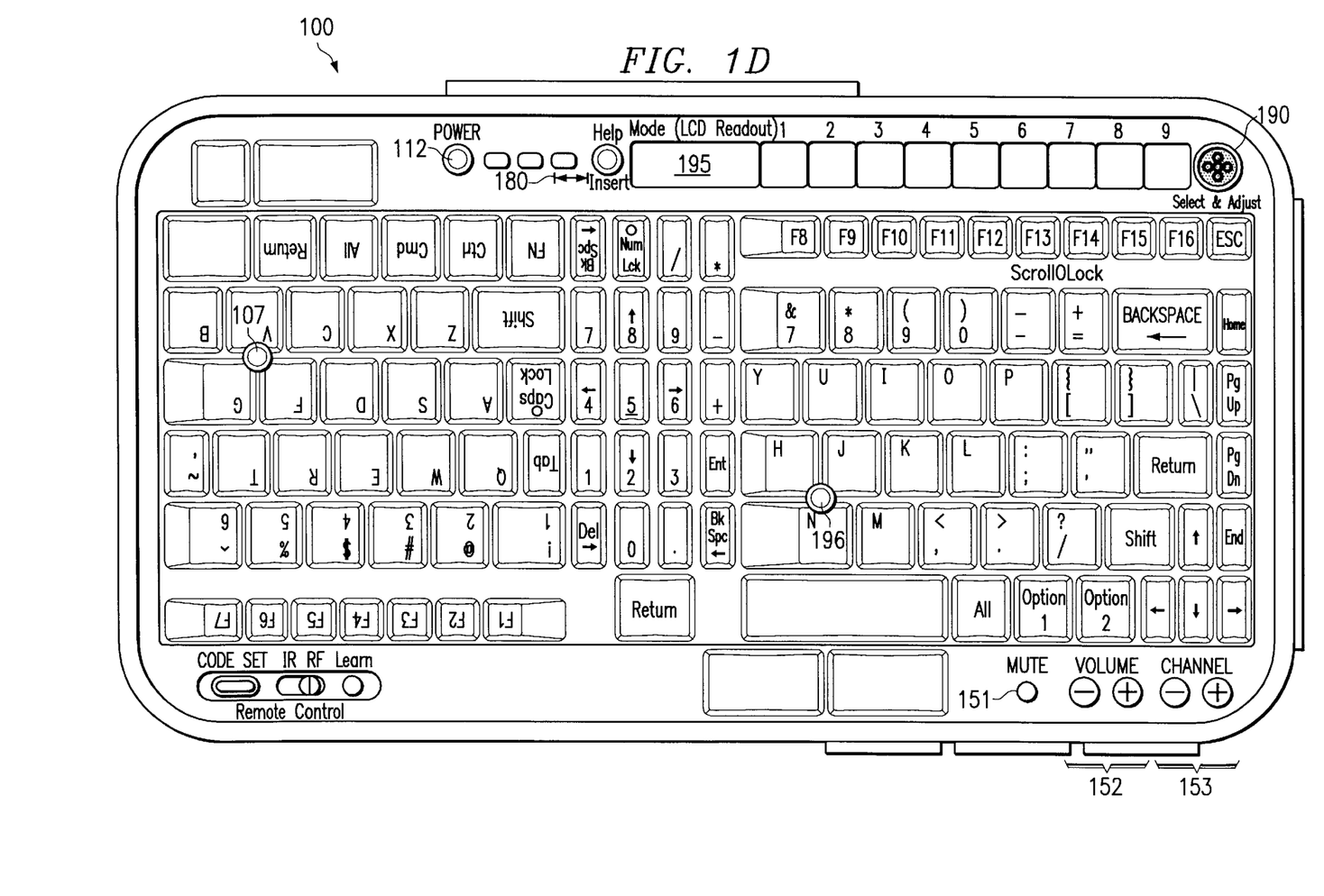
Figure 4:
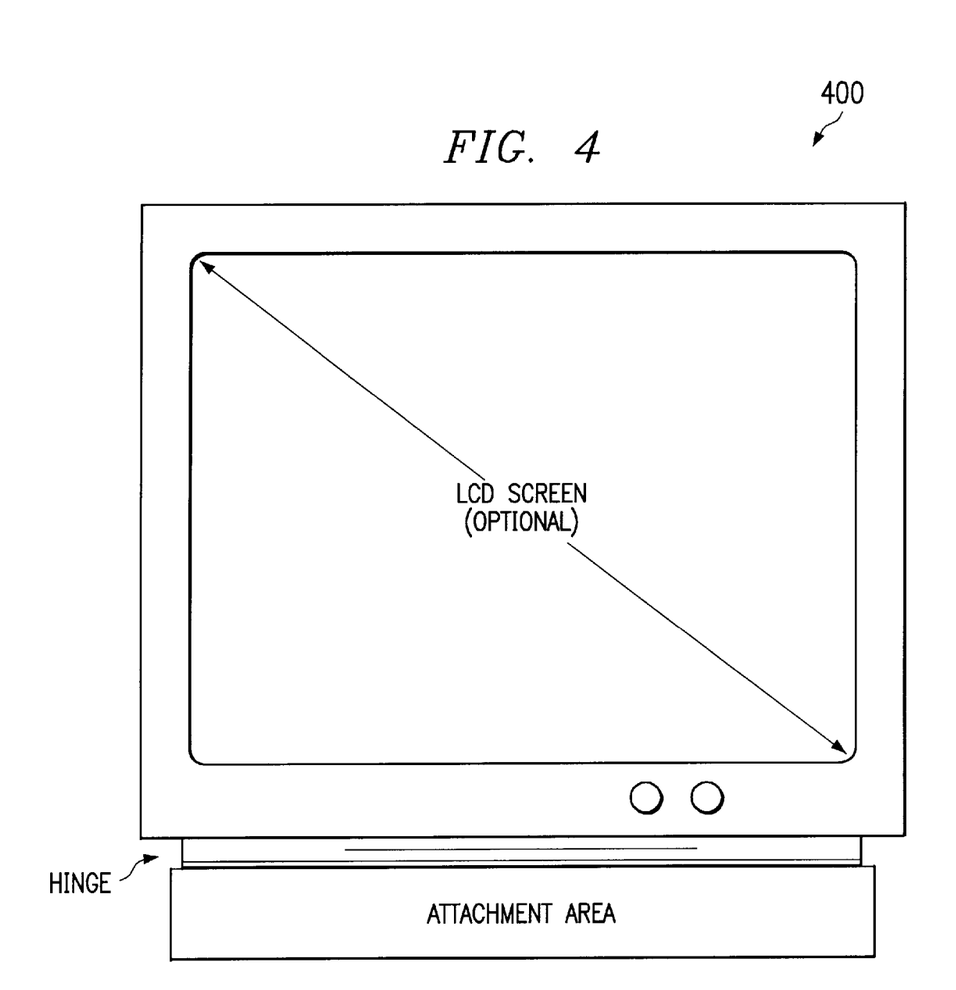
FIG. 4 is a Drawing of an Optional Removable LCD Screen for use with any embodiment of the present invention.

FIG. 4 depicts an optional LCD screen 400, which may be attached to First LCD Monitor Attachment Location 120 or to Second LCD Monitor Attachment Location 125 of FIG. 1C as required. The Hinge allows the screen to be folded down over the keyboard when it is not in use, thereby minimizing the size of the screen-keyboard combination and enhancing portability.

As can be seen from the foregoing description the QWERT key cluster of the keyboard of the present invention may be rotated to allow for cluster operation by the left hand while the user is standing, sitting, or reclining. Additionally, the calculator key cluster of the keyboard may be rotated to allow operation by either hand of the user. Moreover, the keyboard of the present invention provides an improved and more efficient key arrangement for both body-wearable and conventional orientations of the keyboard.

While the invention has been particularly shown and described with reference to a preferred embodiment, it will be understood by those skilled in the art that various changes in form and detail may be made therein without departing from the spirit and scope of the invention.

What is claimed is:

1. A body-wearable keyboard, comprising:
   a first key cluster configured for use by a first hand of a user of the body-wearable keyboard;
   a second key cluster configured for use by the first hand of the user; and
   a third key cluster removably coupled to the keyboard to be capable of being removed, rotated, and replaced back into the keyboard in a body-wear configuration, wherein in the body-wear configuration, the third key cluster is configured to be operated by the second hand of the user, and in a conventional configuration, the third key cluster is not rotated.

2. The keyboard of claim 1, wherein the first key cluster occupies a first end portion of the keyboard for use by the first hand of a user of the body-wearable keyboard, the third key cluster occupies a second end portion of the keyboard for use by the second hand of the user, and the second key cluster occupies a middle portion of the keyboard for use by the first hand of the user.

3. The keyboard of claim 1, wherein the second key cluster is a calculator key cluster containing a plurality of number keys and a plurality of mathematical operator keys.

4. The keyboard of claim 1, wherein the keyboard further comprises:
   a first cursor control mechanism that provides for cursor control by the first hand of the user, comprising:
   a first gimbal control of the first key cluster; and
   a first mouse mechanism, wherein manipulation of the first gimbal control and the first mouse mechanism by the first hand of the user controls a cursor, and
   a second cursor control mechanism that provides for cursor control by the second hand of the user, comprising:
   a second gimbal control of the third key cluster; and
   a second mouse mechanism, wherein manipulation of the second gimbal control and the second mouse mechanism by the second hand of the user controls the cursor.

5. The keyboard of claim 1, wherein the keyboard further comprises:
   a support means for attaching one or more support devices to the keyboard that enable the body of the user to support the keyboard.

6. The keyboard of claim 5, wherein the support means comprises:
   a first strap device to which a strap support is attached.

7. The keyboard of claim 6, wherein the strap support is stored in the keyboard when not used.

8. The keyboard of claim 1, wherein the first key cluster has a first space bar and a first return key, the second key cluster has a first backspace key and a second backspace key, and the third key cluster has a second space bar and a second return key.

9. The keyboard of claim 1, wherein the keyboard further comprises:
   one or more module slots to accommodate one or more modules that are plugged into the keyboard.

10. The keyboard of claim 9, wherein the one or more module slots accommodates a supplemental power module for the keyboard.

11. The keyboard of claim 1, wherein the keyboard further comprises:
    an attachment means for attaching a monitor to the keyboard.

12. The keyboard of claim 11, wherein the attachment means comprises:
    a first attachment device for attaching the monitor to the keyboard in the conventional configuration; and
    a second attachment device for attaching the monitor to the keyboard in the body-wear configuration.

13. The keyboard of claim 12, wherein the first attachment device contains a power source.

14. The keyboard of claim 1, wherein the keyboard further comprises:

a wireless control select mechanism that provides for the user to select a type of wireless control of the keyboard.

15. The keyboard of claim 1, wherein the keyboard further comprises:

an internal power supply of the keyboard.

16. The keyboard of claim 1, further comprising:

a mode means of the keyboard for selectively setting and displaying a mode of the keyboard and displaying assigned functions of a plurality of function keys in accordance with the mode of the keyboard.

17. The keyboard of claim 16, wherein the mode means comprises:

a selection mechanism for selectively setting the mode of the keyboard;

a mode display mechanism for displaying the mode of the keyboard set by the selection mechanism; and a plurality of display mechanisms with each display mechanism corresponding to a function key of a plurality of function keys of the keyboard, wherein each display mechanism displays a function of its corresponding function key as defined by the mode of the keyboard.

18. The keyboard of claim 17, wherein the mode display mechanism is a liquid crystal display and the plurality of display mechanisms are liquid crystal displays.

19. A body-wearable keyboard, comprising:

a first key cluster configured for use by a first hand of a user of the body-wearable keyboard;

a second key cluster removably coupled to the keyboard to be capable of being removed, rotated, and replaced back into the keyboard in a body-wear configuration; and a third key cluster removably coupled to the keyboard to be capable of being removed, rotated, and replaced back into the keyboard in the body-wear configuration, wherein in the body-wear configuration, the second key cluster and the third key cluster are configured to be operated by a second hand of the user and in a conventional configuration, the second key cluster and the third key cluster are not rotated.

20. The keyboard of claim 19, wherein the first key cluster occupies a first end portion of the keyboard for user by the first hand of a user of the body-wearable keyboard, the second key cluster occupies a middle portion of the keyboard for user by the second hand of the user, and the third key cluster occupies a second end portion of the keyboard for use by the second hand of the user.

21. The keyboard of claim 19, wherein the second key cluster is a calculator key cluster containing a plurality of number keys and a plurality of mathematical operator keys.

22. The keyboard of claim 19, wherein the keyboard further comprises:

a first cursor control mechanism that provides for cursor control by the first hand of the user, comprising:
a first gimbal control of the first key cluster; and
a first mouse mechanism, wherein manipulation of the first gimbal control and the first mouse mechanism by the first hand of the user controls a cursor, and a second cursor control mechanism that provides for cursor control by the second hand of the user, comprising:
a second gimbal control of the third key cluster; and
a second mouse mechanism, wherein manipulation of the second gimbal control and the second mouse mechanism by the second hand of the user controls the cursor.

23. The keyboard of claim 19, wherein the keyboard further comprises:

a support means for attaching one or more support devices to the keyboard that enable the body of the user to support the keyboard.

24. The keyboard of claim 23, wherein the support means comprises:

a first strap device to which a strap support is attached.

25. The keyboard of claim 24, wherein the strap support is stored in the keyboard when not used.

26. The keyboard of claim 19, wherein the first key cluster has a first space bar and a first return key, the second key cluster has a first backspace key and a second backspace key, and the third key cluster has a second space bar and a second return key.

27. The keyboard of claim 19, wherein the keyboard further comprises:

one or more module slots to accommodate one or more modules that are plugged into the keyboard.

28. The keyboard of claim 27, wherein the one or more module slots accommodates a supplemental power module for the keyboard.

29. The keyboard of claim 19, wherein the keyboard further comprises:

an attachment means for attaching a monitor to the keyboard.

30. The keyboard of claim 29, wherein the attachment means comprises:

a first attachment device for attaching the monitor to the keyboard in the conventional configuration; and a second attachment device for attaching the monitor to the keyboard in the body-wear configuration.

31. The keyboard of claim 30, wherein the first attachment device contains a power source.

32. The keyboard of claim 19, wherein the keyboard further comprises:

a wireless control select mechanism that provides for the user to select a type of wireless control of the keyboard.

33. The keyboard of claim 19, wherein the keyboard further comprises:

an internal power supply of the keyboard.

34. The keyboard of claim 19, further comprising:

a mode means of the keyboard for selectively setting and displaying a mode of the keyboard and displaying assigned functions of a plurality of function keys in accordance with the mode of the keyboard.

35. The keyboard of claim 34, wherein the mode means comprises:

a selection mechanism for selectively setting the mode of the keyboard;

a mode display mechanism for displaying the mode of the keyboard set by the selection mechanism; and a plurality of display mechanisms with each display mechanism corresponding to a function key of a plurality of function keys of the keyboard, wherein each display mechanism displays a function of its corresponding function key as defined by the mode of the keyboard.

36. The keyboard of claim 35, wherein the mode display mechanism is a liquid crystal display and the plurality of display mechanisms are liquid crystal displays.

37. A keyboard having a mode means of a keyboard for selectively setting and displaying a mode of the keyboard and displaying assigned functions of a plurality of function keys in accordance with the mode of the keyboard, said mode means, comprising:

a selection mechanism for selectively setting the mode of the keyboard;

a mode display mechanism for displaying the mode of the keyboard set by the selection mechanism; and a plurality of display mechanisms with each display mechanism corresponding to a function key of a plurality of function keys of the keyboard, wherein each display mechanism displays a function of its corresponding function key as defined by the mode of the keyboard.

38. The keyboard of claim 37, wherein the mode display mechanism is a liquid crystal display and the plurality of display mechanisms are liquid crystal displays.

39. A method for selectively setting and displaying a mode of the keyboard and displaying assigned functions of a plurality of function keys in accordance with the mode of the keyboard, said method comprising:

selectively setting the mode of the keyboard through a selection mechanism of the keyboard;

displaying the mode of the keyboard through a mode display mechanism of the keyboard; and displaying a plurality of functions of a plurality of function keys of the keyboard through a corresponding plurality of display mechanisms, wherein each display mechanism displays a function of its corresponding function key as defined by the mode of the keyboard.

40. The method of claim 39, wherein the mode displayed is set by the selection mechanism.

* * * * *